June 13, 1967     L. D. SCHMIDT     3,325,253
PROCESS FOR PRODUCING CARBON MONOXIDE
Filed May 29, 1963
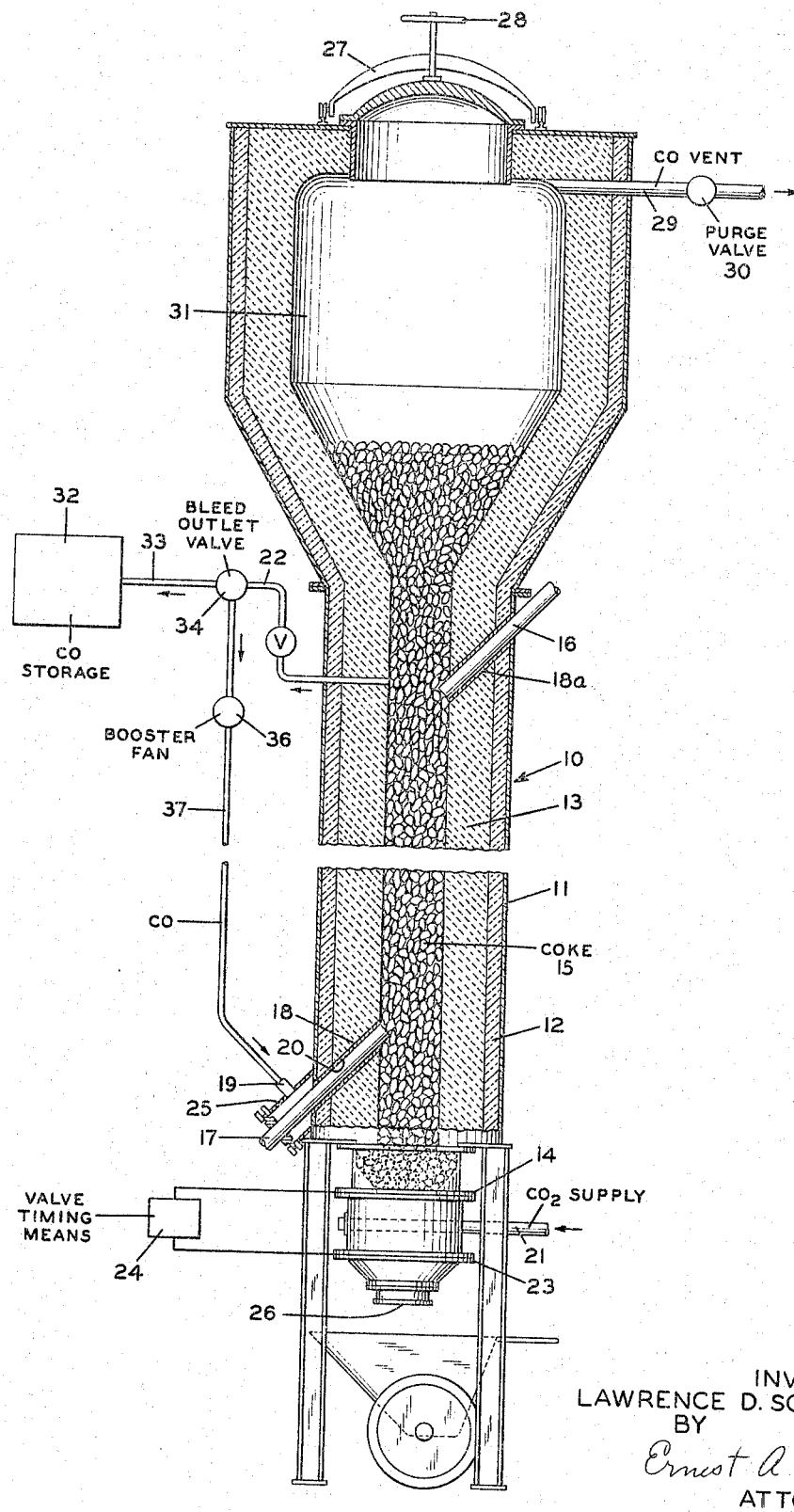
INVENTOR
LAWRENCE D. SCHMIDT
BY
Ernest A. Polin
ATTORNEY

United States Patent Office 3,325,253
Patented June 13, 1967

3,325,253
PROCESS FOR PRODUCING CARBON MONOXIDE
Lawrence D. Schmidt, New York, N.Y., assignor to Allied Chemical Corporation, New York, N.Y., a corporation of New York
Filed May 29, 1963, Ser. No. 284,191
5 Claims. (Cl. 23—204)

This invention relates to a process for the production of carbon monoxide and, more specifically, to a process for producing carbon monoxide by reduction of carbon dioxide in a coke-containing reaction chamber.

It is well known to produce carbon monoxide by reduction of carbon dioxide in the presence of coke. In a typical process, carbon dioxide is introduced into a bed of coke contained in a packed column, heated to desired temperature by electrical means, followed by withdrawal, isolation and storage of the resulting carbon monoxide.

At present, petroleum coke is commonly utilized in the prior art processes since it possesses low volatile matter content and upon reaction results in obtainment of a negligible amount of residual slag. Utilization of petroleum coke has been found to possess the basic disadvantages of high cost and non-uniformity of particle size. The most critical of these is the non-uniformity of particle size since the coke-bed produced therefrom contains numerous channels which allow the carbon dioxide to pass through the reaction chamber without significant reduction to carbon monoxide. Further, hot-spots result which disrupt the securing of homogenous heat distribution and also effect carbon monoxide-product having high carbon dioxide contamination. By reason of these hot-spots and undesirable channelling, supplemental purification procedures such as recycling and/or scrubbing must be employed to decrease the carbon dioxide contamination. In order to completely eliminate these aforementioned disadvantages, it has been proposed to reduce the crude petroleum coke to a uniform particle size. The expense of such reduction, however, renders the entire operation economically untenable.

Coke derived from coal, on the other hand, presents an extremely low-cost carbonaceous material and is therefore, to be preferred in the reduction of carbon dioxide to carbon monoxide. Economically speaking, the coke derived from coal, hereafter referred to as coal-coke, is far superior to its counterpart derived from petroleum. Also, since coal-coke is commercially available in uniform particle size, the elimination of hot-spots and channels within the reaction chamber is readily and economically secured. Heretofore, however, the use of coal-coke has been avoided since operation at elevated temperatures, i.e. above the ash sintering temperature of the coke, could only be realized with significant formation of slag (the molten ash of coke) which, in turn, caused agglomeration and clogging within the reaction column and necessitated frequent production interruption for purposes of removal and cleaning. Since such elevated temperature could not be utilized when coal-coke was employed, the resulting carbon monoxide contained high contamination of carbon dioxide requiring additional refining and purification procedures and a corresponding increase of production cost.

It is therefore an object of the present invention to provide a new and more economical process for producing carbon monoxide by the reduction of carbon dioxide.

Another object of the present invention is to produce carbon monoxide in substantially theoretical yields by utilizing coke derived from the destructive distillation of coal.

In accordance with the present invention, carbon monoxide is produced by passing carbon dioxide countercurrently through a descending column of coke derived from the destructive distillation of coal, said coke being maintained at temperature of about 2000° to 3500° F., discharging residual coke containing at least about 80 percent fixed carbon, and recovering carbon monoxide product from the top of the column.

Residual coke containing at least about 80 percent fixed carbon is obtained by permitting no more than about 60 percent of the fixed carbon of the carbonaceous material charged, i.e. coal-coke, to be gasified. This results in molten slag being retained within a matrix of the residual carbon. The slag-containing matrix readily eliminates the previously recited problems normally encountered in conventional operation thus providing a carbon monoxide-producing operation of maximum efficiency. More specifically, by permitting no more than about 60 percent of the fixed carbon of the coal-coke charged to be gasified elimination of agglomeration or clogging within the reaction column by the formation of slag is readily secured with a corresponding decrease in production cost by dispensation of time-consuming cleaning and removal procedures. The minimum amount of fixed carbon consumed during reaction is only limited by economical considerations. As a practical matter, at least about 20 percent of the fixed carbon is utilized during reaction.

Particularly outstanding results are obtained when the residual coke discharged contains about 80 to 87 percent fixed carbon content.

The proposed process is preferably carried out by employing a packed column in which the coal-coke is introduced from the top by conventional means such as free-flow storage bin or hopper. At least about 40 percent of the fixed carbon contained in the coal-coke passes through the column unconsumed by controlling the rate of coal-coke introduction, considering various correlated factors, such as the size of the reaction column employed, reaction temperature, amount of carbon monoxide to be produced and contact-time of the reactants. Each of the aforementioned variables is more fully discussed below in relationship to maintaining the desired amount of unconsumed fixed carbon present during reaction and to the production of substantially pure carbon monoxide in theoretical yield.

The predominant factor which affects both product-purity and the rate of coal-coke introduction is the reaction temperature employed. Low reaction temperatures increase carbon dioxide contamination while high reaction temperatures promote slag formation. Accordingly, suitable reaction temperatures lie in a range of from about 2000° to 3500° F. and preferably from about 2700° to 3500° C. The maximum temperature heretofore employed in use of coal-coke has been the ash sintering temperature of the coal-coke, i.e. about 2700° F. However, by providing for at least about 40 percent of the fixed carbon content of the feed coke to remain unconsumed during reaction, temperatures far in excess of 2700° F. may be utilized, thus securing theoretical product-purity without rendering the process inoperable by excessive slag formation.

The particle size of coal-coke employed should not exceed about two inches in its largest dimension in order to minimize the possibility of channel formation. A practical consideration of minimum particle size is the avoidance of excessive coke dust which, if present, would be carried over into storage facilities entrained in carbon monoxide product. Coal-coke having a minimum dimension particle size of about ¼ inch has been found to be satisfactory. It is to be understood, however, that due to breakage in handling there is always present a small amount, i.e. up to about 5 percent of the coal-coke, of unavoidable coke dust and small particles having a dimension particle size of less than about ¼ inch. In preferred operation, coal-coke having a maximum dimension particle size of about 1¼ inch and a minimum particle size of about ½ inch is employed.

The capacity of the reaction column is dependent upon the contemplated amount of production. The diameter of the reaction column may be as large as desired but should be at least five times the largest particle-size dimension. Such minimum diameter eliminates any possibility of clogging due to the gravitational flow of the coal-coke through the reaction column. The length of the column is limited only by engineering consideration derived from the particular mode of operation.

Contact-time of the reactants within the column may vary over a wide range; however, it has been found that time in excess of 10 seconds produces no significant increase of product yield or purity. Contact-time below one second, on the other hand, is insufficient to secure theoretical conversoin of the carbon dioxide to the carbon monoxide. For highest efficiency and corresponding theoretical yield and purity, contact-time within the reaction column in the range of from 2 to 6 seconds is preferred.

Since operational temperatures in excess of 2700° F. may be employed in the present process, the feed coke may readily be calcined by allowing a small amount (i.e. up to about 10 percent by weight) of the hot gaseous carbon monoxide product to by-pass the product withdrawal means and contact the incoming feed coke. Such contact of hot gaseous product with the feed coke distills off volatile matter comprised essentially of sulfurized contaminants, and the volatile matter is discarded by venting from the top of the reaction column. Since the calcining operation does not take place within the reaction zone, a feed coke of highest purity is reacted resulting in the production of carbon monoxide product free of such contamination normally encountered in conventional operation.

The accompanying drawing represents a vertical sectional view of apparatus used in carrying out the process of the present invention.

Referring to the drawing, foundry coke 15 having a maximum dimension particle size of about 2 inches and a minimum particle size of about ¼ inch is introduced to the top of reaction column 10 through charging door 27 secured by lock-wheel 28 into coke-hopper 31. Coke-hopper 31 has sufficient capacity consistent with efficient production whereby frequent coke charging is eliminated. Reaction column 10 is cylindrical in shape and consists of thin outer steel plating 11, insulating material 12, and an inner shell of heat-retaining material 13 which is suitably composed of porcelain or ceramic material. The charged foundry coke is supported by valve 14 located at the bottom of the column. Valve 14 is a check valve or an interlocking grate arrangement whereby, when closed, the solid coke is supported on the top thereof and the introductory flow of carbon dioxide is allowed to pass unimpeded through the valve into the reaction column. The column is heated by means of electrodes 16 and 17, conventionally made of carbon or graphite, which are located at the top and the bottom of the column, respectively, in order to obtain homogenous heat distribution. Both electrodes are encased in refractory walls 18 and 18a. However, the encasement of bottom electrode 17 is not gas tight but provided with annular space 20 through which a stream of carbon-monoxide-product is allowed to pass to provide an inert atmosphere about the electrode, such atmosphere is necessary since the electrode is conventionally made of carbon or graphite and would normally be reduced by carbon dioxide gas entering the bottom of column 10 thus resulting in accelerated erosion and decomposition. Bottom electrode 17 is secured by housing 25 which is equipped with gas inlet 19. There is no need to provide a similar inert atmosphere for top electrode 16 since gaseous contact is with predominantly carbon monoxide-product containing a minute amount of carbon dioxide contaminant.

The coke is heated to temperature of about 2000° to about 3500° F., and carbon dioxide, introduced into the column through line 21, passes through valve 14 below electrode 17 and proceeds upwardly through the column. The contact-time of the carbon dioxide with the coke generally varies from about one to 10 seconds. In order to insure that the coke residue analyzes above 80 percent fixed carbon throughout the reaction, a simple carbon analysis of the coke initially discharged through aperture 26 is carried out. If such analysis indicates that less than 80 percent fixed carbon is present the rate of gas flow may be decreased. In preferred operation, however, the rate of withdrawal of coke residue is simply increased thereby effecting a decrease of coke-residence time within the reaction column. By providing such an excess of fixed carbon molten slag formed is isolated and embedded within a matrix of the residual carbon so that it can neither hinder the flow of coke nor attack the inner shell of the column.

Valve 23 is a gas-tight valve which permits withdrawal of unconsumed coke from the bottom of the column. Valves 14 and 23 operate complementary to one another and are synchronized by conventional timing means 24 so that when one valve is opened the other remains closed.

Up to about 95 percent of the carbon monoxide product is withdrawn through valved product-recovery line 22 and is passed into storage facilities 32 via line 33. Bleed valve outlet 34 is provided between lines 22 and 23, wherein a slight amount of carbon monoxide is recirculated by means of booster fan 36 through line 37 and inlet 19 to bottom electrode 17 in order to provide an inert atmosphere about the electrode, as described above. The feed coke becomes preheated as it traverses feed hopper 31 and, as it enters the proximity of electrode 16, reaches calcination temperature releasing volatile matter. In preferred operation, a small proportion of the hot carbon monoxide product, say up to about 10 percent, is passed upwardly through the feed hopper to purge the volatilized material from the coke prior to its participation in the reaction. This quantity of carbon monoxide product, which ordinarily does not exceed about 5 percent of the total carbon monoxide product, together with purged volatile material, exits the system by carbon monoxide vent line 29 regulated by purge valve 30.

The following example is given for the purpose of illustration.

*Example*

A conventional reaction column comprised of coke-hopper, coke-bed column and lower base is employed. The overall dimension of the column is approximately 30 feet in height and 3 feet in outer diameter. The coke-hopper located at the upper section of the reaction column is approximately 8½ feet in length and has an inner diameter of approximately 4 feet to 5 feet in its largest dimension and has a coke capacity of about one ton. The lower section of the coke-hopper is approximately 1 foot in diameter and feeds the coke into the coke-bed column located directly below. This column is about 15 feet in height and 1 foot in diameter. The lower base is comprised of supporting I-beams, complementary flow valves, introductory means for carbon dioxide and a withdrawal aperture for residual material. The supporting I-beams are approximately 5 feet in height while the housing containing the valves, carbon dioxide introductory means and withdrawal aperture is about 3 feet in height and 2 feet in diameter. Into this reaction column is charged 144 pounds per hour of foundry coke having a maximum dimension particle size of about 1¼ inches and a minimum particle size of about ½ inch. The analysis of the charged foundry coke is as follows.

| Component: | Percent by weight |
|---|---|
| Moisture | 2 |
| Volatile matter | 1 |
| Fixed carbon | 89 |
| Ash | 8 |

The charged coke is heated to 2800° F. by conducting electric current between the electrodes. Carbon dioxide is then introduced at the rate of 246 pounds per hour. The contact time of the carbon dioxide as it passes upward through the reaction column is about two seconds. About 168 pounds of coke residue is removed from the bottom of the reaction column about once every two hours. Analysis of the coke residue shows a fixed carbon content of about 87 percent by weight and an ash content of about 13 percent by weight. Molten slag formed is retained within a matrix of the residual carbon. Carbon monoxide is produced at a rate of about 300 pounds per hour. 15 pounds of carbon monoxide product (about 5 percent of yield) is allowed to by-pass the withdrawal means and to contact the incoming feed-coke thereby effecting calcination. Analysis of the product shows about 98 percent by weight of carbon monoxide and 2 percent by weight of carbon dioxide.

Although certain preferred embodiments of the invention have been disclosed for purposes of illustration, it will be evident that various changes and modifications may be made therein without departing from the scope and spirit of the invention.

I claim:

1. A process for the production of carbon monoxide which comprises passing carbon dioxide countercurrently through a descending column of coke derived from the destructive distillation of coal, said coke being maintained at a temperature of about 2700° to 3500° F., discharging residual coke containing at least about 80 percent fixed carbon, whereby agglomeration of said coke is substantially avoided, and recovering carbon monoxide product from the top of the column.

2. A process in accordance with claim 1 wherein the coke charged has a maximum dimension particle size of about 2 inches and a minimum particle size of about ¼ inch.

3. A process in accordance with claim 1 wherein the contact-time of the reactants is from about 1 to 10 seconds.

4. A process in accordance with claim 1 wherein a small proportion of carbon monoxide product exiting the column is directed upwardly through preheated coke charge approaching the column to purge the same of volatile matter.

5. A process for the production of carbon monoxide which comprises passing carbon dioxide countercurrently through a descending column of coke derived from the destructive distillation of coal, said coke having a maximum dimension particle size of about 1¼ inches and a minimum particle size of about ½ inch and being maintained at a temperature of about 2700° to 3500° F., for a contact-time of from about 2 to 6 seconds, discharging residual coke containing from about 80 to 87 percent fixed carbon, whereby agglomeration of said coke is substantially avoided, and recovering carbon monoxide product from the top of the column.

References Cited

UNITED STATES PATENTS

| 1,865,053 | 6/1932 | Woodruff | 23—204 |
| 2,012,477 | 8/1935 | Olson | 23—204 |
| 2,400,194 | 5/1946 | Day et al. | 23—288 |
| 2,607,667 | 8/1952 | Stalhed et al. | 23—204 |
| 2,921,840 | 1/1960 | Johnson et al. | 23—204 |
| 3,046,093 | 7/1962 | Alexander | 23—204 |

OTHER REFERENCES

Johnson et al.: "Fuels and Combustion Handbook," 1st edition, 1951, pages 83–87, 148–149.

OSCAR R. VERTIZ, *Primary Examiner.*

MAURICE A. BRINDISI, MILTON WEISSMAN, *Examiners.*

R. M. DAVIDSON, *Assistant Examiner.*